Patented June 2, 1925.

1,540,446

UNITED STATES PATENT OFFICE.

ROBERT E. WILSON, OF CHICAGO, ILLINOIS, ASSIGNOR TO THE BALTIMORE GAS ENGINEERING CORPORATION, OF BALTIMORE, MARYLAND.

ALUMINUM GELLIKE ABSORBENT AND PROCESS FOR MAKING SAME.

No Drawing. Original application filed January 28, 1920, Serial No. 354,690. Divided and this application filed July 9, 1924. Serial No. 725,037.

*To all whom it may concern:*

Be it known that I, ROBERT E. WILSON, a citizen of the United States, residing at Chicago, in the county of Cook and State of Illinois, have invented certain new and useful Improvements in Aluminum Gellike Absorbents and Processes for Making Same; and I do hereby declare the following to be a full, clear, and exact description of the invention, such as will enable others skilled in the art to which it appertains to make and use the same.

This application is a division of my application Serial No. 354,690, filed Jan. 28, 1920.

This invention relates to a dense, hard granular, partially hydrated, gel-like absorbent consisting of aluminum hydroxide having ultra microscopic pores, and to the process of making the same. Previous to this invention aluminum hydroxide gel has been made both by dialysis of a colloidal solution of basic aluminum chloride for several days using a semi-permeable membrane and following the procedure commonly used in the preparation of true hydroxide gels, as well as by means of direct precipitation of the hydroxides from solutions of aluminum salts by means of alkalies. While by the former method it was possible to make true aluminum hydroxide gels, the process was so extremely slow and expensive that there was no possibility of its being used as a commercial method of making the gel. On the other hand, the aluminum hydroxides previously made by precipitation, when dried and formed into rough granular material, was found to be soft, resembling soft baked clays and having a very low absorptive power. Where any specific directions are given for the preparation of precipitated aluminum chloride, complete dehydration is specified. The product of this invention can be made only when employing the most careful control of the preparation of solutions, precipitation, and drying. It is very hard, dense, and has a vitreous fracture. The best samples hold from 8 to 12 per cent of water after drying several hours in a vacuum 150° C., while ordinary precipitated aluminum hydroxide is almost completely dehydrated by this treatment. Aluminum hydroxide prepared according to the method disclosed in this invention is a good absorbent, comparing favorably with activated charcoal (with which it may be mixed if desired) against such gases as phosgene and chloropicrin. It also has a great capacity for the absorption of water vapor from gases or gaseous mixtures. The material also has advantages wherever a dense, firm structure of aluminum oxide, metallic aluminum, or many aluminum compounds, are desired for catalytic and other purposes.

It was found that certain steps in the production of this absorbent constitute important variables in the preparation of an extremely active gel. The aluminum hydroxide is precipitated from a solution of its salts, for instance, aluminum chloride by means of an alkali such as caustic soda and the precipitate filtered and dried. The temperature of the precipitate, the pressure in the filter press, and the exact method of drying are especially important factors. It was also found that a concentration of solutions of from 6 to 10 per cent and a reaction temperature of from 30 to 50° C. gives the best precipitate. The solution after precipitation should contain an excess of alkali, but not sufficient to appreciatively redissolve the precipitate. Washing by decantation should be very thorough. A fairly high pressure should be used in forming the filter cake to squeeze out all the excess water. The temperature of drying is important and should not exceed 225° C., better results being obtained at temperatures below 200° C. The drying should be slow at the start and is preferably performed in two stages as hereinafter described.

A method of preparation of this absorbent which has been found to give good results is as follows: A 6 per cent solution of aluminum chloride in water is poured slowly and with constant stirring into a 6 per cent solution of caustic soda, the amount of caustic soda being somewhat in excess of the theoretical amount necessary for complete precipitation, and the temperature of the two solutions being maintained between 30 and 50° C. It is very important that the solutions be stirred constantly and that the aluminum chloride be poured into the alkali, not vice versa. The precipitate is washed by decantation until the wash water shows only a trace of chlorides. The sludge is filtered in a filter press at a pressure of 85 to 100 pounds per square inch, kneaded until uniform, and packed in a cake about one and one-half to two inches deep in screened bottom trays which are put immediately into an oven in a relatively low temperature of 110° C., with a free circulation of air. When the cake appears perfectly dry, it is removed, ground, and screened to the required mesh and dried for six to eight hours at 150° C., under a vacuum of twenty-seven or twenty-eight inches. It appears to be of some advantage to boil the sludge for a short time before filtering, filter, and then subject the precipitate to high pressure.

Although in the specific examples given above, certain definite proportions and specific steps are enumerated, it is not intended that this invention be limited to such details of procedure, but it is desired to claim the new gel-like aluminum hydroxide and the process of making the same as set forth in the following claims; for instance, other concentrations of solutions may be used, other alkalies such as ammonium hydroxide may replace the caustic soda in the precipitation and other salts of aluminum may replace the aluminum chloride. It is also possible to produce the new absorbent at reacting temperatures varying somewhat from those specified in the above examples.

What I claim and desire to secure by Letters Patent is:—

1. A hard, rough, partially hydrated, gel-like material consisting essentially of aluminum hydroxide.

2. A partially hydrated gel-like aluminum oxide absorbent.

3. A partially hydrated gel-like aluminum oxide absorbent having ultra microscopic pores.

4. A gel-like aluminum hydroxide containing 8 to 15 per cent combined water as determined by igniting to a low red heat.

5. An absorbent comprising a gel-like aluminum hydroxide mixed with absorbent charcoal.

6. In a process of producing gel-like absorbents, washing by decantation an aluminum hydroxide absorbent after precipitation, and then drying same at about 110° C., and then at about 150° C.

7. In a process of producing a gel-like absorbent, washing by decantation an aluminum hydroxide absorbent after precipitation, kneading and then drying same first at about 110° C., in air, and then about 150° C. in a vacuum.

8. In a process of producing gel-like absorbent, washing by decantation an aluminum hydroxide absorbent after precipitation, kneading and then drying same at relatively low temperature, and finally at a relatively higher temperature.

In testimony whereof I affix my signature.

ROBERT E. WILSON.